(12) United States Patent
Stein et al.

(10) Patent No.: US 8,212,221 B2
(45) Date of Patent: Jul. 3, 2012

(54) DUAL-RANGE PHOTON DETECTOR

(75) Inventors: Jürgen Stein, Wuppertal (DE); Guntram Pausch, Dresden (DE); Cristina Plettner, Köln (DE)

(73) Assignee: ICX Technologies GmbH, Solingen (DE)

( * ) Notice: Subject to any disclaimer, the term of this patent is extended or adjusted under 35 U.S.C. 154(b) by 143 days.

(21) Appl. No.: 12/674,932

(22) PCT Filed: Feb. 16, 2009

(86) PCT No.: PCT/EP2009/001057
§ 371 (c)(1), (2), (4) Date: Feb. 24, 2010

(87) PCT Pub. No.: WO2009/100941
PCT Pub. Date: Aug. 20, 2009

(65) Prior Publication Data
US 2010/0200762 A1      Aug. 12, 2010

(30) Foreign Application Priority Data

Feb. 15, 2008  (EP) .................................. 08101698

(51) Int. Cl.
*G01T 1/20*  (2006.01)
(52) U.S. Cl. ............... 250/370.11; 250/370.01
(58) Field of Classification Search ............... 250/336.1, 250/361 R, 367, 369, 370.01, 370.06, 370.08, 250/370.09, 370.11
See application file for complete search history.

(56) References Cited

U.S. PATENT DOCUMENTS 5,684,850 A * 11/1997 Warburton et al. ............. 378/53
5,773,829 A * 6/1998 Iwanczyk et al. ............. 250/367

FOREIGN PATENT DOCUMENTS

WO   WO 00/28351   5/2000

OTHER PUBLICATIONS

Van Loef et al., "Scintillation properties of LaBr3:Ce3+ crystals: fast, efficient and high-energy-resolution scintillators." Nuclear Instruments and Methods in Physics Research. Elsevier, Amsterdam, NL.vol. 486, Issues 1-2, Jun. 2002, pp. 254-258.*
Marisaldi, Martino, et al., "A Pulse Shape Discrimination Gamma-Ray Detector Based on a Silicon Drift Chamber Coupled to a CsI(TI) Scintillator: Prospects for a 1 keV-1 MeV Monolithic Detector", *IEEE Transactions on Nuclear Science*, V. 51, No. 4 (Aug. 2004), pp. 1916-1922.

(Continued)

*Primary Examiner* — Mark R Gaworecki
(74) *Attorney, Agent, or Firm* — Stein McEwen, LLP

(57) ABSTRACT

The invention relates to a detector for measuring nuclear radiation, especially gamma-radiation, comprising a scintillator crystal with a light decay time of less than 100 ns, a silicon drift detector (SDD) for the measurement of both direct hits of low energy radiation and the light, being emitted from the scintillator crystal, the silicon drift detector being mounted between the scintillation crystal and the radiation entry window, a preamplifier, connected to the SDD, electronic devices, being capable of determining the signal rise time of the measured signals and of separating the signals on the basis of said rise time, electronic devices, being capable of separately collecting the energy spectra of SDD and scintillator detection events on the basis of the different rise times.

11 Claims, 6 Drawing Sheets

OTHER PUBLICATIONS

Fiorini, C., et al., "Gamma-Ray Spectroscopy With LaBr$_3$:Ce Scintillator Readout by a Silicon Drift Detector", *IEEE Transactions on Nuclear Science*, V. 53, No. 4 (Aug. 2006), pp. 2392-2397.

Fiorini et al. "A large-area monolithic array of silicon drift detectors for medical imaging." *Nuclear Instruments and Methods in Physics Research, Section A-Accelerators, Spectrometers, Detectors and Associated Equipment.* Elsevier, Amsterdam, NL. vol. 568, No. 1. Nov. 8, 2006, pp. 96-100.

International Preliminary Report on Patentability issued by the PCT Office on Aug. 26, 2010.

* cited by examiner

DUAL-RANGE PHOTON DETECTOR

The invention is related to a dual range photon detector for detecting gamma and x-ray radiation, comprising a scintillator crystal and a semiconductor detector.

Compact, ruggedized instruments capable of detecting and classifying radioactive materials are urgently needed to uncover and to prevent illicit trafficking. The classification of sources and materials is based on nuclide identification using gamma radiation as a fingerprint.

Most instruments exploit scintillation or CZT detectors. High purity germanium (HPGe) systems are in fact distinguished by superior resolution, but size, power consumption, i.e. for cooling, and prize restrict their applicability.

The identification performance is, consequently, controlled by the limited detector resolution, in spite of recent developments like the $LaBr_3(Ce^{3+})$ scintillator and the progress made in manufacturing of Cadmium-Zinc-Telluride (CZT) detectors. In addition, the resolution of scintillator crystal detectors is significantly limited when the radiation energy is below 100 keV.

Semiconductor detectors, for example Silicon Drift Detectors (SDD), are also known from prior art. A SDD is mainly a rather thin Silicon disc with an anode in its center and at least one ring-like cathode in the outer part of the detector. When a photon is absorbed in the SDD, the negative charged particles move—drift—towards the center and create a pulse when the charged particles arrive at the anode.

SDD's can be operated without cooling and show a good energy resolution for photon energies below 100 keV. This is known for example from P. Lechner, C. Fiorini, R. Hartmann, J. Kemmer, N. Krause, P. Leutenegger, A. Longoni, H. Soltau, D. Stütter, R. Stütter, L. Strüder, U. Weber, "Silicon drift detectors for high count rate X-ray spectroscopy at room temperature," Nucl. Instr. Meth., vol. A 458, pp. 281-287, 2001.

As a consequence, combinations of scintillator crystals with silicon detectors (SD), including with silicon drift detectors (SDD), have been used for decades.

From C. Fiorini, A. Gola, M. Zanchi, A. Longoni, P. Lechner, H. Soltau, and L. Strüder, "Gamma-Ray Spectroscopy With $LaBr_3$:Ce Scintillator Readout by a Silicon Drift Detector," IEEE Trans. Nucl. Sci., vol. 53, no. 4, pp. 2392-2397, 2006, a gamma-ray detector is known, using $LaBr_3(Ce^{3+})$ as a scintillator crystal. The photons emitted from the scintillator are collected and measured with a SDD, which, therefore, is mounted at the rear side of the crystal, that is the side, being opposite to where the radiation to be measured is entering the crystal. The SDD is not used to detect direct hits, that is low energy gamma-radiation, but only to collect and measure the amount of light emitted by the scintillator, following an absorption of gamma-radiation.

If the light decay time of the scintillator is large compared with the charge collection time in the SDD, the interactions of photons or charged particles with the SDD and with the scintillator generate detector signals with different time characteristics. M. Marisaldi, C. Labanti, and H. Soltau, "A Pulse Shape Discrimination Gamma-Ray Detector Based on a Silicon Drift Chamber Coupled to a CsI(Tl) Scintillator: Prospects for a 1 keV-1 MeV Monolithic Detector," IEEE Trans. Nucl. Sci., vol. 51, no. 4, pp. 1916-1922, 2004, disclose a dual range photon detector, combining a CsI(Tl) scintillation crystal having a large light decay time with a silicon drift chamber or SDD with a much faster charge collection time.

The low energy gamma or x-ray photons are detected within the SDD, the higher energy photons within the scintillation crystal. The light emitted by the scintillator is again measured with the SDD.

In order to distinguish between the direct (low energy) hits in the SDD and the light emission from the scintillator, Marisaldi et al. make use of the significantly different timing properties, being necessary to distinguish between direct hits (SDD) and light emission (scintillator). An SDD creates a fast signal with a rise time between 50 ns and 200 ns. The CsI(Tl) scintillator was chosen by Marisaldi et al not only because it is a non hygroscopic easy to handle material, but mainly because of its long de-excitation times of 680 ns and 3.340 ns respectively. According to this disclosure, the pulses are sent through two independent amplification chains with different shaping times of 500 ns (fast chain) and 3.000 ns (slow chain). As the ratio of the pulse heights are approximately constant for pulses of common shape, this will allow discrimination between the interactions taking place in SDD or in the scintillator.

One of the main disadvantages of such a system is the need for a scintillation crystal like CsI(Tl) with a light decay time, being substantially higher than the signal rise time of the SDD. Scintillation crystals with a short light decay time, coming down into the order of the signal rise time of the SDD cannot be used as the shaping time difference of the slow and the fast amplification channel would not be sufficient to allow for a comparable discrimination. As the light decay time of the scintillator does have an impact to the underlying noise and its energy resolution, the overall resolution of a detector as proposed by Marisaldi et al is limited.

The main purpose of the present invention is therefore to avoid those disadvantages and to provide a dual range photon detector with an increased resolution especially at higher energies. Therefore, a new detector, being able to bypass those constraints, has been successfully identified and tested. It combines two distinct detection mechanisms in a compact, state-of-the-art solid-state detector, providing complementary information in different but overlapping energy ranges.

More specifically, this problem is solved by providing a detector for measuring nuclear radiation, especially gamma-radiation and x-rays, comprising a scintillator crystal with a light decay time of less than 200 ns, preferably less than 100 ns or even less than 50 ns, in combination with a silicon drift detector (SDD) for the measurement of both direct hits of low energy radiation and the light, being emitted from the scintillator crystal, whereas the silicon drift detector is mounted between the scintillation crystal and the radiation entry window. In addition, the detector comprises a preamplifier, connected to the SDD, electronic devices, being capable of determining the signal rise time of the measured signals and of separating the signals on the basis of said rise time, as well as electronic devices, being capable of separately collecting the energy spectra of SDD and scintillator detection events on the basis of the different rise times.

In a preferred embodiment, the detector comprises an LaBr3(Ce3+) scintillation crystal, having a light decay time in the order of 40 ns.

It is an advantage if the preamplifier is partly integrated in the SDD. The energy resolution may be improved by providing means for cooling the detector. In most of the cases it is sufficient to cool down the detector for a limited time only, so that the cooling may be provided by a Peltier element. In most of the times it is sufficient to provide cooling for a time period in between 10 s to 600 s.

It is a further advantage if the detector according to the invention provides means for spectrum analysis and radionuclide identification, either hard- or software implemented. The signals are sampled with a preferred sampling rate of 5 MS/s to 5000 MS/s, especially preferred of 5 MS/s to 500 MS/s.

It is an advantage also if the detector provides means for digital signal processing, including means for preventing ballistic deficit.

A specific embodiment of the invention is discussed in the following, using FIGS. 1 to 8:

FIG. 2 shows measured preamplifier and shaping amplifier output signals, whereas

Figure 1:
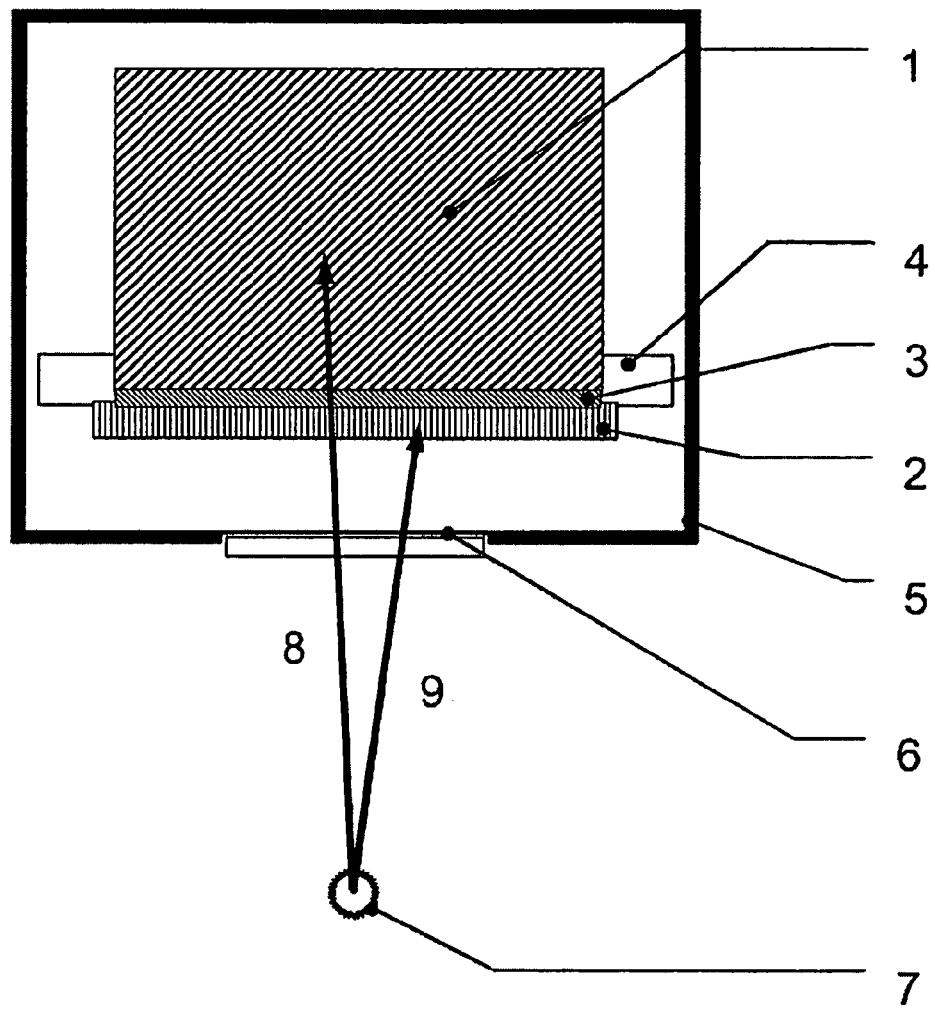
FIG. 1 shows the principal setup of the inventive detector.

FIG. 1 shows dual-range detector, consisting of a $LaBr_3$ ($Ce^{3+}$) scintillator (1) coupled to a silicon drift detector (SDD) (2), mounted within a housing (5). The SDD-chip (2) is connected to the scintillation crystal (1) by an optical glue or grease (3). The SDD-chip (2) itself is connected to a backing (4). The gamma radiation, emitted from a source (7) enters the detector from SDD side through an entrance window (6). Low energy radiation (9) is absorbed and detected mostly within the SDD (2), whereas higher energy radiation (8) will mostly be absorbed in the scintillator crystal (1). The SDD (2) serves as a high-resolution X-ray and low-energy gamma detector on its own, and in parallel as a light readout device for the $LaBr_3(Ce^{3+})$ scintillator (1) ensuring best possible resolution at higher energies.

This dual-range detector based on a fast scintillator with silicon readout combines for the first time the excellent performance of an SDD as photon detector below 100 keV with the striking energy resolution of $LaBr_3(Ce^{3+})$ read out by an SDD at higher energies. Here, the pulse shapes due to photon absorption in silicon or scintillator differ only because of a geometrical effect, which has been employed in a detector by this invention for the first time: The scintillation flash illuminates a large area of the SDD; the drift paths of corresponding photoelectrons and, consequently, their drift times to the anode are very different. This causes a long slope of the anode signal composed of contributions from different SDD regions. Photon detection in the SDD is, in contrary, a local process yielding steep signals.

Two experimental detection systems were mounted and have been tested in order to investigate prospects of such an arrangement. The SDD modules of type SDD-30-138, with an optical coating suitable for $\lambda=380$ nm, were purchased from PNSensor. Both modules comprise an SDD chip mounted on a ceramics backing with Peltier cooling element in a compact housing. Encapsulated 6 mm×6 mm $LaBr_3$ ($Ce^{3+}$) (BrilLanCe®380) crystals were purchased from Saint Gobain Crystals. The scintillators (1) were fixed with optical grease (3) on the rear contact sides of the 30 mm² SDD chips (2). One SDD module is distinguished by a perforated backing and Peltier element, which allowed exposing the SDD side of the detector configuration to gamma radiation as can be seen in FIG. 1.

All data presented in the following figures were taken at room temperature without using the Peltier element, with the SDD operated at 23-28° C.

Figure 2:
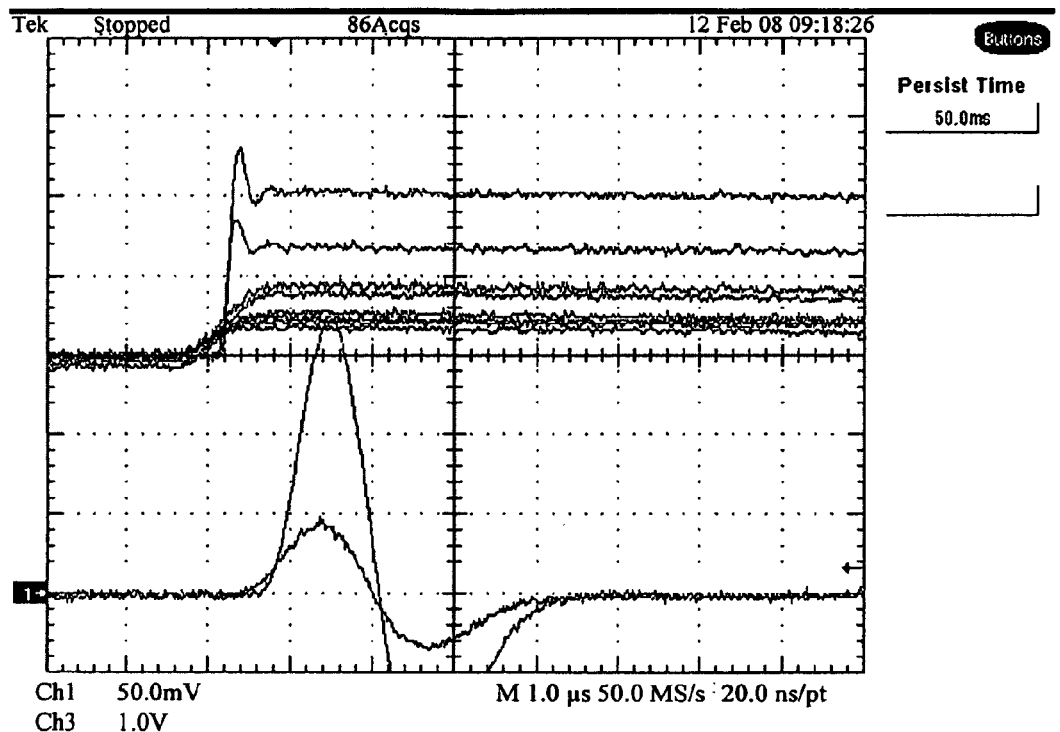

The two $LaBr_3(Ce^{3+})$-SDD systems, S-1 and S-2, are distinguished by an energy resolution of 2.7% and 2.9% at 662 keV, respectively, while the resolution measured with the same crystals combined with common photomultiplier tubes (PMT) was only ~3.5%. The quantum efficiency of both systems was measured and consistently found to be about 55%. FIG. 2 presents a screen shot with detector signals taken while exposing the SDD side of S-2 to a $^{137}Cs$ source. The screen shots of FIG. 2 show preamplifier (PA, Ch1; upper part of the figure) and shaping amplifier (SPA, Ch3; lower part of the figure) output signals. SDD events are distinguished by rise times <200 ns (PA, Ch1). Scintillator events exhibit longer rise times (~800 ns), even if the light decay time of the scintillator crystal is just 41 ns. This reflects the drift path and drift time variance of the photo electrons.

Figure 3:
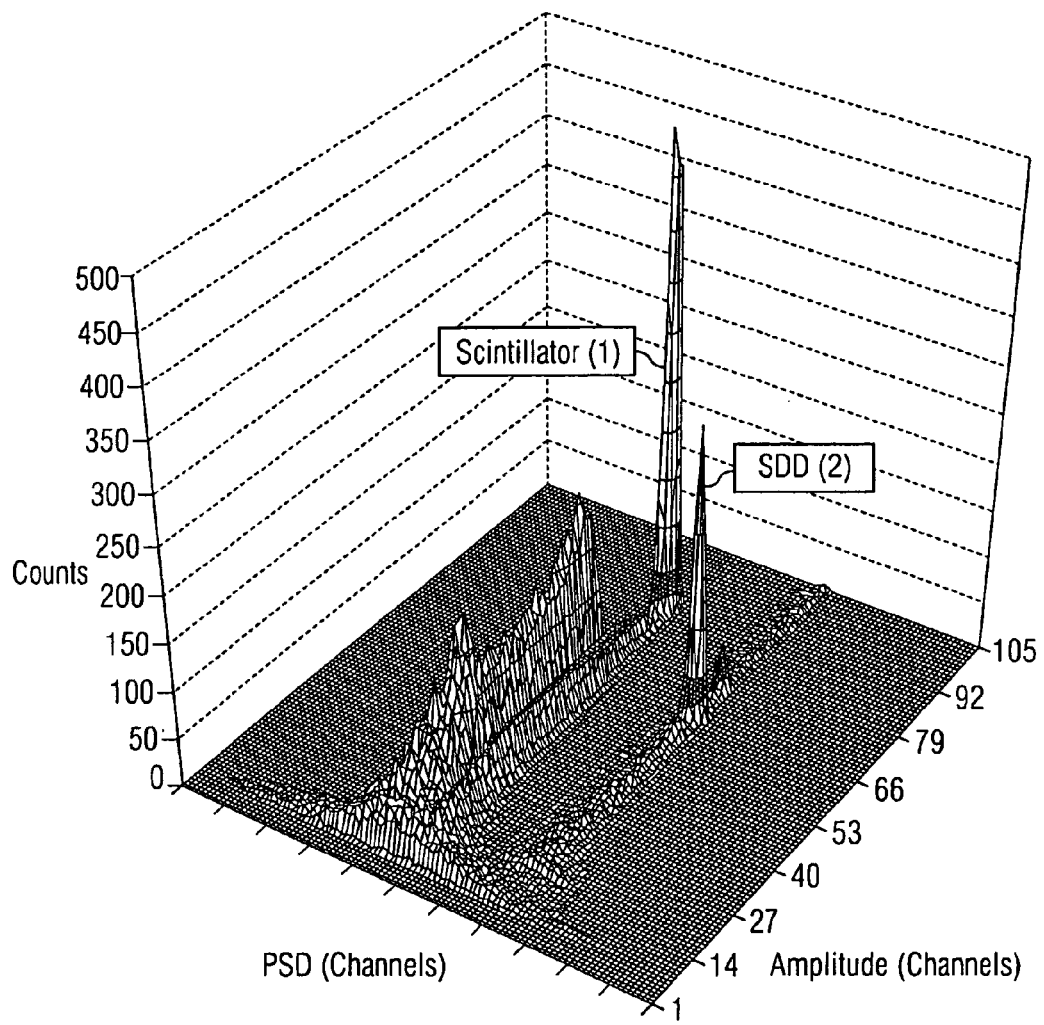
FIG. 3 shows a three dimensional detector count spectrum, showing the effect of the achieved pulse shape discrimination.

It is evident that pulse shape discrimination (PSD) allows separating the SDD and scintillator events, as demonstrated later on with the digitizing system in FIG. 3. Detector counts versus pulse amplitude and pulse width (PSD) measured with $^{137}Cs$ source at room temperature can be seen here. Pulse shape discrimination allows distinguishing scintillator and SDD events. Dominating peaks are due to 662 keV gammas absorbed in the scintillator, and due to 32 keV Ba—X rays absorbed in the SDD.

In order to fathom the benefit of such dual-range detectors for nuclide identification, the system S-2 was exposed to gamma radiation from different sources. The detector signals were shaped with a preamplifier from PNSensor followed by a Canberra 2020 spectroscopy amplifier, and digitized at a sampling rate of 20 MHz with a GaGe CompuScope®. Simple algorithms modeling the standard analogue signal processing including PSD allowed collecting the energy spectra of scintillator and SDD events in parallel. Results are shown in FIGS. 4 to 8.

Figure 4:
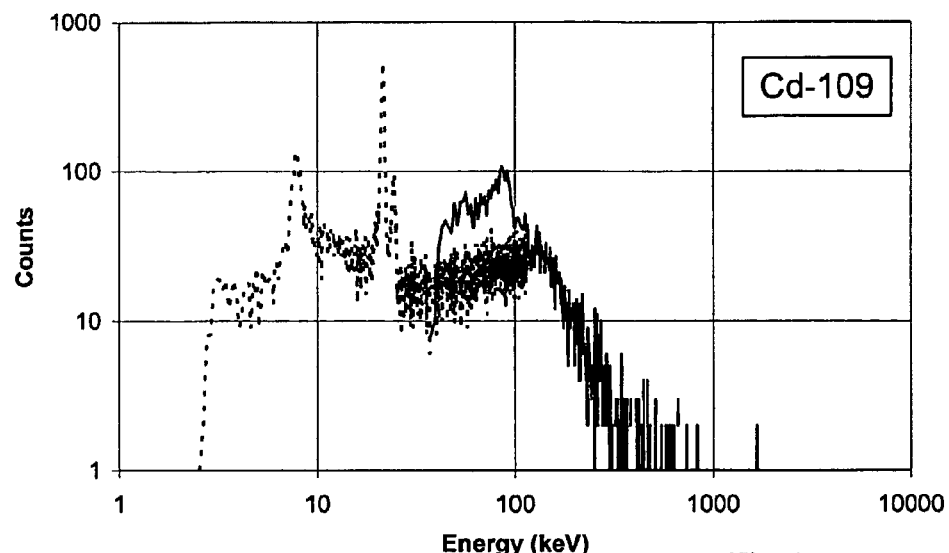
FIGS. 4 to 8 show measured energy spectra of scintillator and SDD events for a set of radioactive sources at room temperature.
Figure 5:
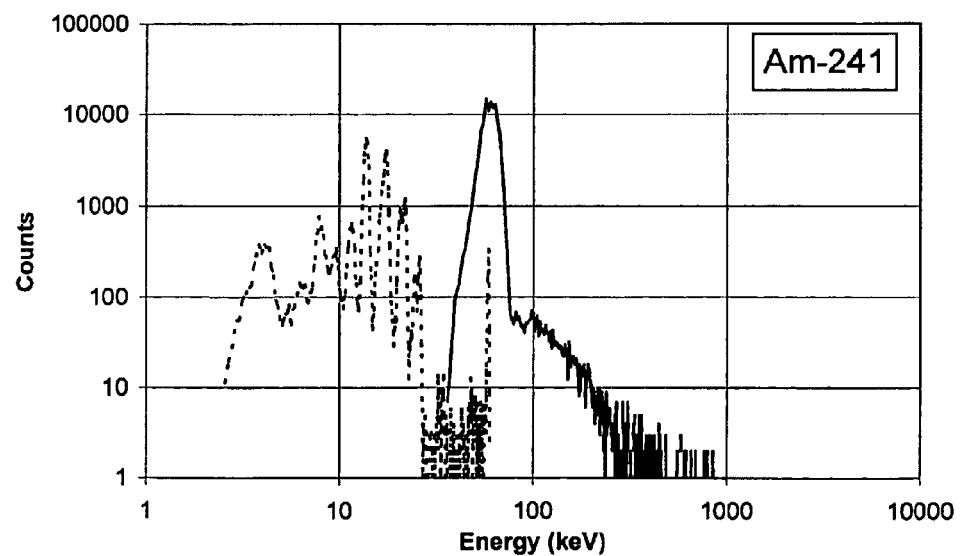
Figure 6:
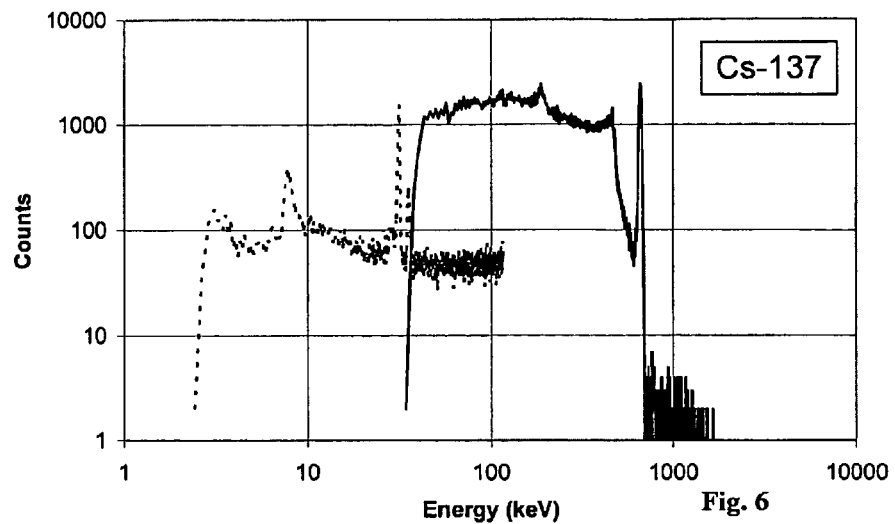
Figure 7:
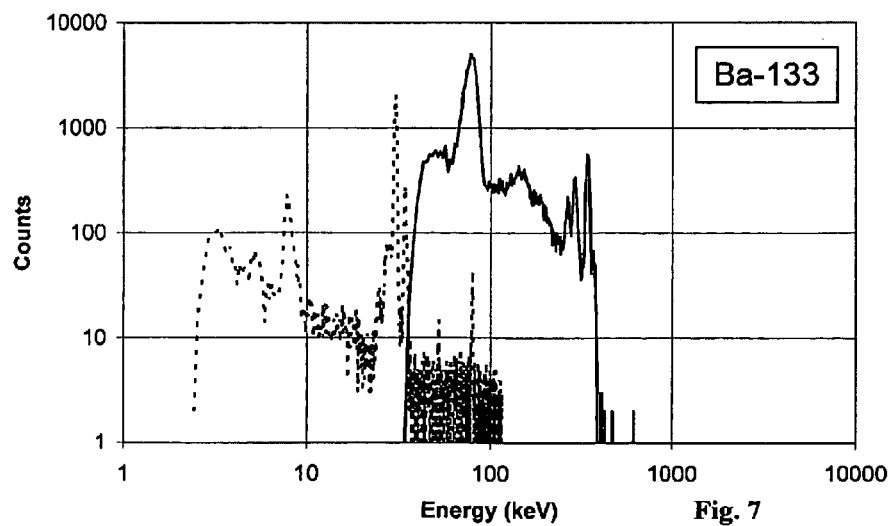
Figure 8:
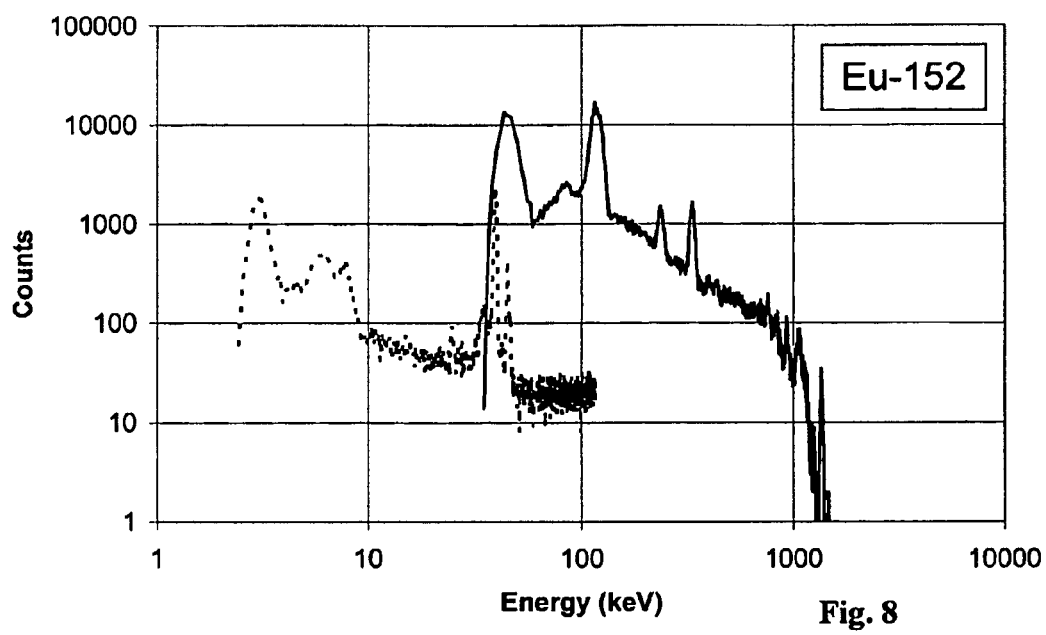

There, energy spectra of scintillator and SDD events, separated by PSD, as measured for a set of radioactive sources at room temperature are presented. FIG. 4 shows a measurement with $^{109}Cd$ as a radioactive source, FIG. 5 with $^{241}Am$, FIG. 6 with $^{137}Cs$, FIG. 7 with $^{133}Ba$ and FIG. 8 with $^{152}Eu$. The dual-range detector according to the invention is gathering complementary information in different energy ranges with the two detection mechanisms combined in a monolithic device. An 8 keV XRF line due to the copper block (4) is present with all sources. This demonstrates that the invention is capable of detecting shielding material surrounding a radioactive source, which is important for classifying suspicious materials and for estimating absolute activities of sources.

The overall detection range covers almost three decades. In practice, the lower energy limit will be controlled by absorption in the entrance window (6) of a protective housing. The upper limit is due to the small crystal size; but larger SDD chips and SDD arrays are available and could be combined with larger $LaBr_3(Ce^{3+})$ crystals.

The SDD spectrum, covering the low-energy range up to (at least) 80 keV, exhibits superior resolution if compared with a scintillator. It uncovers line structures which could never be observed with a scintillator or Cadmium Zink Telluride (CZT) detector, and which are well suited for nuclide identification and for the identification of shielding materials by analyzing corresponding X-ray fluorescence radiation. The SDD resolution here compensates the decreasing detection to efficiency at energies >30 keV (cf. FIG. 4, $^{133}Ba$ and $^{241}Am$ spectra).

At the high energy end, the quantum efficiency and low noise contribution of the SDD provide a better energy resolution of the scintillator spectrum if compared with a scintillator-photomultiplier combination.

In practical applications one has to consider that the electron drift times, ranging up to some hundred nanoseconds, are influenced by the device temperature. Cooling decreases the charge carrier mobility, which is reflected in a larger maximum drift time (from the edge of the SDD to the anode). In case of scintillator events this results in a larger signal rise time. This means a temperature dependent ballistic deficit if analogue shaping with the optimum shaping time around 1 µs is applied. Digital signal processing with appropriate algorithms preventing a ballistic deficit is therefore strongly recommended.

The invention is very useful for many applications. Examples are compact, handheld radionuclide identification devices, or modular, large-area imaging (standoff) radiation detection systems based on multiple dual-range detectors.

The invention claimed is:

1. A detector for measuring nuclear radiation comprising
a scintillator crystal with a light decay time of less than 100 ns,
a silicon drift detector (SDD) for the measurement of signals for both direct hits of low energy radiation and light, being emitted from the scintillator crystal, the silicon drift detector being mounted between the scintillation crystal and the radiation entry window,
a preamplifier connected to the SDD,
electronic devices capable of determining a signal rise time of the measured signals and of separating the signals on the basis of the determined rise time, and
electronic devices capable of separately collecting energy spectra of SDD and scintillator detection events on the basis of the different rise times.

2. The detector according to claim 1, wherein the scintillator crystal has a light decay time of less than 50 ns.

3. The detector according to claim 2, wherein the scintillator crystal comprises $LaBr_3(Ce^{3+})$.

4. The detector according to claim 1, wherein the preamplifier is partly integrated in the SDD.

5. The detector according to claim 1, further comprising a cooling device for cooling the detector.

6. The detector according to claim 5, wherein the cooling device comprises a Peltier cooling element for providing a temporary temperature drop at the detector.

7. The detector according to claim 6, wherein the Peltier cooling element provides cooling for a time period in between 10 s to 600 s.

8. The detector according to claim 1, further comprises a spectrum analyzer which analyzes performs spectrum analysis and radio-nuclide identification.

9. The detector according to claim 1, further comprising a digital sampler which digitally samples the signals with sampling rates of 5 MS/s to 5000 MS/s.

10. The detector according to claim 9, further comprises a digital signal processor which prevents ballistic deficit.

11. The detector according to claim 1, further comprising a digital sampler which digitally samples the signals with sampling rates of 5 MS/s to 500 MS/s.

* * * * *